Figure 1:
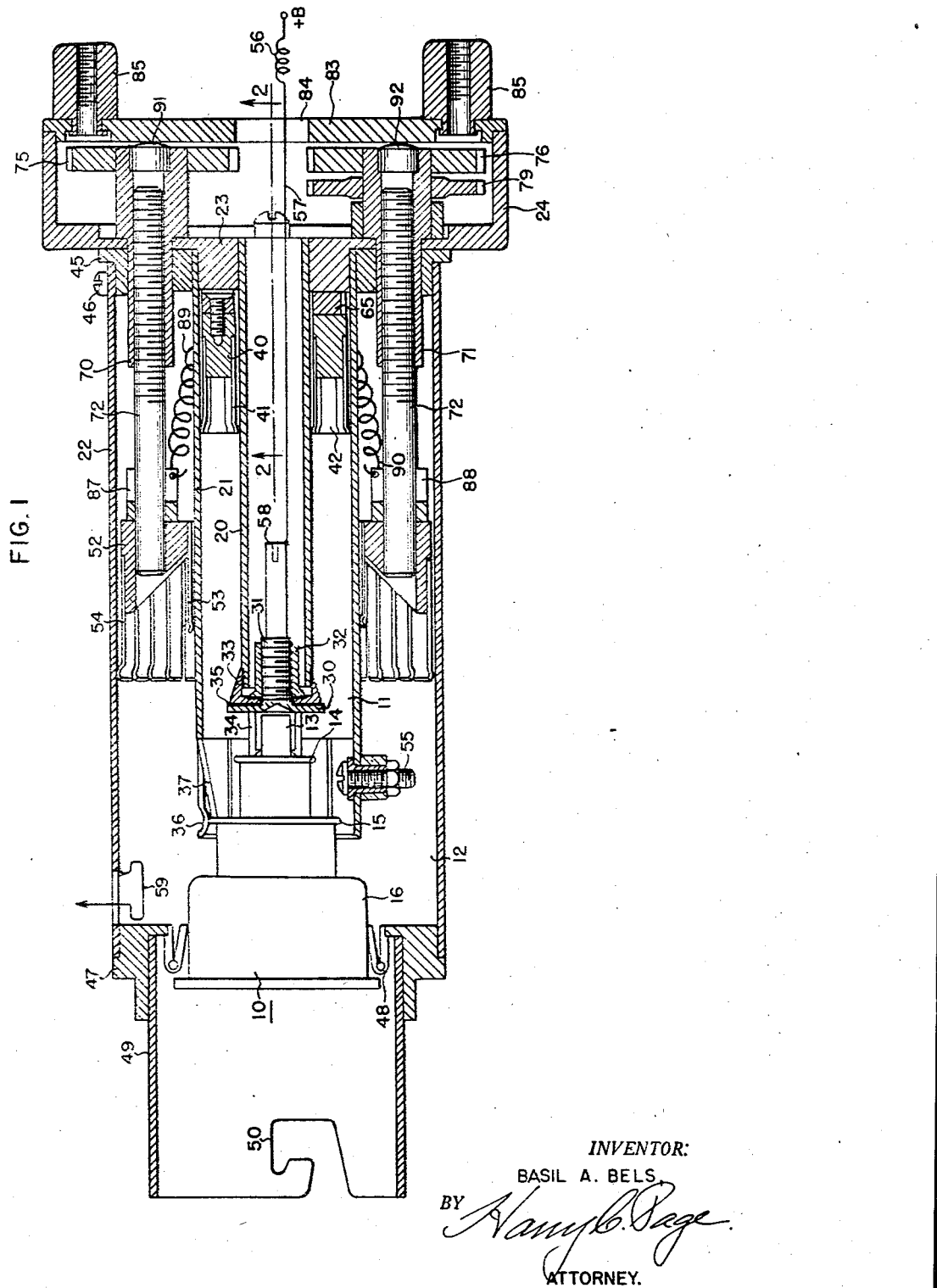

Aug. 3, 1948.  B. A. BELS  2,446,405
TUNABLE ULTRA HIGH FREQUENCY RESONATOR SYSTEM
Filed Oct. 31, 1945  2 Sheets-Sheet 2

INVENTOR:
BASIL A. BELS,
BY *Harry C. Page*
ATTORNEY.

Patented Aug. 3, 1948

2,446,405

UNITED STATES PATENT OFFICE 2,446,405

TUNABLE ULTRA HIGH FREQUENCY RESONATOR SYSTEM

Basil A. Bels, Great Neck, N. Y., assignor, by mesne assignments, to Hazeltine Research, Inc., Chicago, Ill., a corporation of Illinois Application October 31, 1945, Serial No. 625,895

10 Claims. (Cl. 178—44)

1

This invention is directed to an electrical system of the type that includes at least a pair of tunable circuit devices and associated adjustable elements for tuning each of the devices over a range of operating wave lengths. The invention is subject to general application but is especially suited for use in an ultra-short-wave signal generator and will be particularly described in that connection.

In the construction of signal generators for operation at ultra-short wave lengths, it is common practice to employ tunable resonant-circuit devices exhibiting uniformly distributed inductance and capacitance. Such devices may take any of a variety of forms. One form commonly referred to as a "resonant cavity" comprises a section of a coaxial transmission line, having inner and outer conductors and a short-circuiting ring adjustable therealong for tuning. Vacuum tubes, constructed for use with these resonant cavities, are known. The "lighthouse" tube, for example, which derives its name from the tube configuration may be inserted into one end of the resonant cavity, coupling the cavity between a selected pair of its electrodes. Thus, a signal generator of the type under consideration may comprise a triode vacuum tube of the lighthouse construction and a pair of tunable resonant cavities coupled respectively between its anode and control electrode and between its cathode and control electrode.

While such generators have proved to be satisfactory, some difficulty has been encountered in tuning them over a desired range of operating wave lengths. In the usual case, an adjustable plunger secured to the tuning ring projects from each cavity for manual manipulation. When force is applied to the plunger to displace the tuning ring, an unbalanced condition arises in which there is an undesirable tendency for the ring to bind between the inner and outer conductors of its cavity. This tendency has been overcome in other arrangements including a pair of plungers fixed to diametrically spaced points of a given tuning ring. Where a pair of plungers have been provided to displace each ring, unduly complicated and expensive unicontrol mechanisms have been utilized to effect simultaneous displacements of the tuning rings in adjusting the operating wave length of the generator.

It is an object of the present invention, therefore, to provide a tunable electrical system which avoids the above-mentioned limitations of prior arrangements.

2

It is another object of the invention to provide an electrical system having a pair of tunable circuit devices and including an improved arrangement for effecting simultaneous or independent adjustments of its tunable devices.

A tunable electrical system in accordance with the invention comprises a pair of tunable circuit devices each of which includes an adjustable element supported for longitudinal displacement with respect to a common reference axis to tune each of the devices over a range of operating wave lengths. Two pairs of rotatable drive shafts are supported in parallel relationship with the reference axis and mechanically coupled to the tuning elements to effect only longitudinal displacements thereof. A pair of identical gears is fixedly secured to corresponding portions of one of the pairs of shafts and a pair of identical gears is also fixedly secured to corresponding portions of the other of the pairs of shafts. An additional gear is freely rotatable on one shaft of the one pair in meshing engagement with the fixed gears secured to the other pair. The system also has means, including a gear adjustably fixed on one shaft of the other pair in meshing engagement with the fixed gears secured to the one pair, for selectively effecting simultaneous or independent rotational displacement of the two pairs of shafts.

For a better understanding of the present invention, together with other and further objects thereof, reference is had to the following description taken in connection with the accompanying drawings, and its scope will be pointed out in the appended claims.

Figure 2:
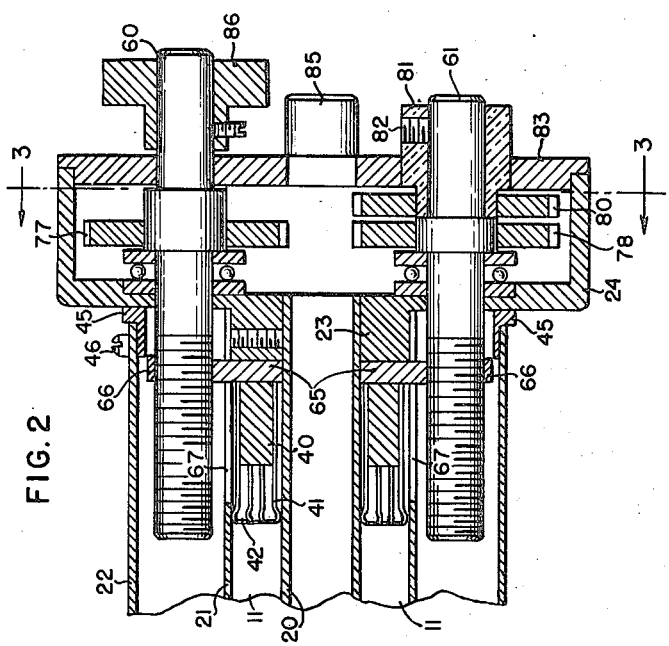
Figure 3:
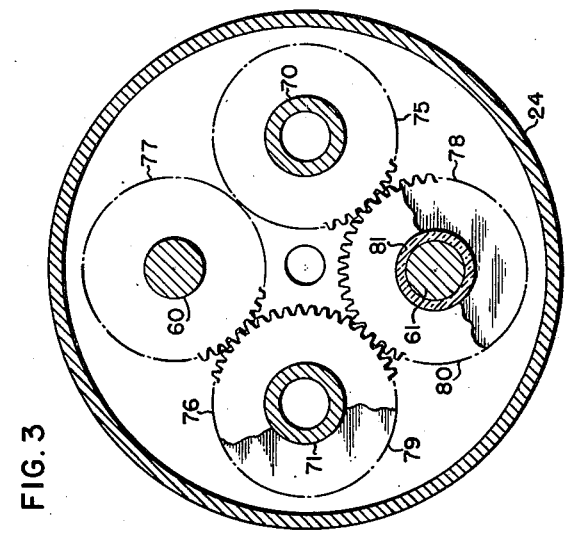

In the drawings, Fig. 1 is a cross-sectional view of a tunable electrical system embodying the invention; Fig. 2 is a cross-sectional view taken as indicated by direction arrows 2—2 of Fig. 1; and Fig. 3 is a view taken as indicated by direction arrows 3—3 of Fig. 2.

Referring now more particularly to Fig. 1 of the drawings, there is represented a cross-sectional view of a tunable electrical system, specifically an ultra-short-wave oscillator-generator, including the present invention. This generator comprises an electron-discharge device 10, or vacuum tube of the triode type, and a pair of associated tunable circuit devices illustrated as coaxially aligned resonant cavities 11 and 12. Tube 10 is the so-called "lighthouse" tube having an anode 13, an anode ring 14, a control electrode or grid ring 15, and a conductive shell 16 capacitively coupled to a cathode electrode (not shown). The tube also has conventional terminal prongs to facilitate making connections to a suitable source of heater voltage but, for the sake of simplicity, the prongs and heater voltage have been omitted from the drawing.

The resonant cavities 11 and 12 are provided by three hollow concentric cylindrical conductors designated 20, 21 and 22. Conductors 20 and 21 constitute the inner and outer conductors, respectively, of cavity 11. The ends of these conductors remote from tube 10 are closed by a hub portion 23 of a gear housing 24 which serves to maintain the conductors in coaxial alignment. The opposite ends of these conductors carry connectors for engaging electrode terminal portions of tube 10. The anode connector is designated 30 and has a centrally located, externally threaded portion 31. An internally threaded bushing 32 threads onto portion 31 and is tightened to support the anode connector from an end cap 33 of inner conductor 20. It also has a centrally located anode clip 34 projecting in the opposite direction from extension 31. The clip 34 is essentially a cylindrical projection which is longitudinally slotted to constitute a ring of resilient contact fingers proportioned yieldably to engage anode electrode 13. A dielectric material 35 is interposed between elements 30, 31, 32 and 33. It insulates element 33, coupled to the grid 15 of tube 10 by way of conductors 20 and 21, from the direct current path of anode 13, including elements 30 and 32. At the same time it constitutes a condenser for completing an alternating current path between the anode and grid. The grid connector consists of a circle of formed, resilient contact fingers 36 obtained by slotting and suitably shaping one end of conductor 21. Selected ones of the grid contact fingers, such as 37, are shortened and deflected toward the axis of the cavity to provide stop projections for properly positioning tube 10 within its anode and grid connectors.

An adjustable short-circuiting element supported for longitudinal displacement with respect to the common axis of the cavities is included in cavity 11 for tuning the cavity over a range of operating wave lengths. This tuning element has a ring portion 40 which supports an inner circle of resilient contact fingers 41 and an outer circle of resilient contact fingers 42 which slidably engage conductors 20 and 21, respectively. It is positioned within the inter-conductor space of these conductors and is slidable therealong under the control of a tuning control mechanism to be described more particularly hereinafter.

Conductors 21 and 22 constitute the inner and outer conductors, respectively, of the second resonant cavity 12. The ends of these conductors remote from tube 10 are closed by a ring member 45 to which conductor 22 may be releasably secured through machine screws 46. The opposite end of conductor 22 is closed by a disc 47 centrally apertured to accommodate a resilient cathode connector 48. If desired, a socket 49 may project from disc 47 and include a slotted portion 50 to effect a bayonet type of connection with a plug (not shown) to be connected to the terminal prongs of tube 10 for completing the circuits thereof. Resonant cavity 12 also includes an adjustable short-circuiting element supported for longitudinal displacement with respect to the common axis of the cavities to tune cavity 12 over a range of operating wave lengths. This tuning element is similar to that provided for cavity 11 but is displaced longitudinally thereof in the direction of tube 10. It has a ring portion 52 which carries an inner circle of resilient contact fingers 53 and an outer circle of resilient contact fingers 54 which slidably engage conductors 21 and 22, respectively. Short-circuiting element 52—53—54 may be displaced along conductors 21 and 22 through the tuning control mechanism presently to be described.

An adjustable probe, in the form of a machine screw 55, projects through the intermediate conductor 21 and affords a feed-back path between resonant cavities 11 and 12 as required to sustain oscillations. A source of space current, indicated +B, may be applied to the anode of tube 10 through a signal-frequency choke 56 and a conductor 57 connected with an extension 58 of the anode connector 30. A magnetic type of pick-up device 59 is positioned within resonant cavity 12 and may be utilized to derive an output signal from the generator.

The tuning control mechanism for displacing the short-circuiting elements to tune cavities 11 and 12 comprises two pairs of rotatable drive shafts, supported in the space between conductors 21 and 22 in parallel relationship with respect to their common axis. One pair, 60 and 61, is rotatably supported in gear housing 24 and is mechanically coupled to the short-circuiting element of resonant cavity 11, as shown in Fig. 2. To this end, the tuning element supports an annular member 65 having radially extending links 66 which project through longitudinal slots 67 of the intermediate conductor 21. The links 66 have internally threaded portions which engage externally threaded portions of shafts 60 and 61. The other pair of shafts, 70 and 71 (Fig. 1), are rotatably supported by gear housing 24 and disc 45 and are hollow, having an internal thread. This pair is mechanically coupled to the short-circuiting element of resonant cavity 12 through externally threaded rods 72, 72 which are received by the threaded portions of shafts 70 and 71.

The shafts may be rotated to effect only longitudinal displacement of the short-circuiting elements through a gear system contained within housing 24 as shown in Fig. 3. This system includes a pair of identical gears 75 and 76 fixedly secured to corresponding portions of one pair of the shafts, namely, shafts 70 and 71. It also includes identical gears 77 and 78, the same as gears 75 and 76 but fixedly secured to corresponding portions of the other pair of shafts, 60 and 61. An additional gear 79, similar to those already identified, is supported by and freely rotatable about shaft 71. This gear 79 is in meshing engagement with gears 77 and 78. The drive system under consideration also includes a gear 80, adjustably fixed on shaft 61 in meshing engagement with gears 75 and 76. Gear 80 has a hub portion 81 and is releasably locked to shaft 61 by one or more set screws 82 (Fig. 2). It comprises means for selectively effecting simultaneous or independent rotational displacement of both pairs of shafts 60, 61 and 70, 71.

The gear housing 24 is provided with a cover plate 83 having a centrally located aperture 84 through which conductor 57 may extend. The cover plate has internally threaded projections 85 which may be utilized in securing the generator to any desired supporting structure. Shaft 60 projects through the cover plate and carries at its free end a control knob 86. Shaft 61 and the bushing 81 of gear 80 also project through the cover plate, as illustrated in Fig. 2. An anti-backlash arrangement may be provided to avoid backlash between the drive shafts and the short-circuiting elements of the resonant cavities. For this purpose, anchor posts 87 and 88 are secured to disc 52 of the short-circuiting element of resonant cavity 12. Tension coil springs 89 and 90 are positioned in the space between conductors 21 and 22, extending between these anchor posts and links 66 of the short-circuiting element of resonant cavity 11. These springs appear in Fig. 1 where they are indicated as disappearing behind conductor 21 for connection with links 66. The springs bias the short-circuiting tuning elements 40—41—42 and 52—53—54 toward one another. Plugs 91 and 92 inserted into the free ends of shafts 70 and 71, respectively, have a point contact with cover plate 83 and reduce the friction otherwise resulting from the biasing effects of springs 89 and 90.

In considering the operation of the described arrangement, it will be seen that the generator comprises a triode vacuum tube 10 having a first resonant cavity 11 coupled to its anode and control electrodes and a second resonant cavity 12 coupled to its cathode and control electrodes with a feedback therebetween provided by stud 55. The first of these cavities determines the operating wave length of the oscillator. The second is proportioned so that the arrangement represents an oscillatory circuit similar to the well-known Colpitts oscillator, the operation of which is well understood in the art.

In describing the operation of the tuning mechanism, it will be assumed initially that set screws 82 securely fix hub 81 and gear 80 to shaft 61. If control knob 86 is now rotated, shaft 60 is driven directly. At the same time, gears 77 and 79 drive gear 78 so that the companion shaft 61 is rotated along with shaft 60. Rotation of these shafts is translated through links 66 to effect only longitudinal displacement of the short-circuiting element 40—41—42 of resonant cavity 11, tuning this cavity over a range of wave lengths. Furthermore, for the assumed conditions, gear 80 rotates with shaft 61 and drives the alternate pair of shafts 70 and 71 through gears 75 and 76. In this manner, the short-circuiting element of cavity 12 is similarly displaced to tune the cathode cavity. Since identical gears are used throughout the drive mechanism, all four shafts receive the same rotational displacement for a given adjustment of control knob 86. If the diameter and threads on the shafts are the same throughout, the short-circuiting elements of cavities 11 and 12 experience identical longitudinal displacements. However, it is frequently desirable to effect a greater displacement of one tuning element than the other, which may be accomplished by utilizing different gear ratios in the driving system and/or by having different threads on the driving shafts. The latter expedient is utilized in the instant case wherein the operating characteristics of the oscillation generator are such that the tuning element of the anode cavity requires the greater displacement in tuning over a desired range of wave lengths. Accordingly, the threads of shafts 60 and 61 are proportioned with reference to the threads of shafts 70 and 71 so that greater displacement is effected of the short-circuiting element of anode cavity 11 for a given rotational displacement of the four shafts.

By loosening set screws 82 and releasing gear 80 for free rotation about shaft 61, either of the short-circuiting elements may be adjusted independently of the other. For example, when gear 80 rotates freely about shaft 61, the rotation of this gear by means of its hub 81 drives shafts 70 and 71 through gears 75 and 76 independently of shafts 60 and 61. This follows since gear 79 freely rotates on shaft 71. It will also be apparent that rotation of control knob 86, when set screws 82 are released, drives only shafts 60 and 61. Thus, in the described arrangement, the two pairs of shafts utilized in tuning the anode and cathode cavities over their operating ranges may be rotated simultaneously or independently. This permits the cavities to be tuned together over a range of operating wave lengths or to be adjusted with respect to one another as may be required to attain optimum operation at any selected wave length within the range. It is evident therefore that the arrangement is extremely flexible.

The short-circuiting elements define effective and noneffective portions of the resonant cavities. That is to say, the portion of each cavity located on the side of the short-circuiting element remote from tube 10 has no electrical function and may thus be considered noneffective. The drive mechanism is located within this noneffective portion of each cavity. This is advantageous because, in general, the electric and magnetic fields of the effective portions of the cavity are disturbed by the presence of any structures contained therein. With the described arrangement, the field distribution is not adversely influenced by driving mechanism.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A tunable electrical system comprising, a pair of tunable circuit devices each of which includes an adjustable element supported for longitudinal displacement with respect to a common reference axis to tune each of said devices over a range of operating wave lengths, two pairs of rotatable drive shafts supported in parallel relationship with said reference axis and mechanically coupled to said tuning elements to effect only longitudinal displacements thereof, a pair of identical gears fixedly secured to corresponding portions of one of said pairs of shafts, a pair of identical gears fixedly secured to corresponding portions of the other of said pairs of shafts, a gear freely rotatable on one shaft of said one pair in meshing engagement with said fixed gears secured to said other pair, and means including a gear adjustably fixed on one shaft of said other pair in meshing engagement with said fixed gears secured to said one pair for selectively effecting simultaneous or independent rotational displacement of said two pairs of shafts.

2. A tunable electrical system comprising, a pair of tunable circuit devices each of which includes an adjustable element supported for longitudinal displacement with respect to a common reference axis to tune each of said devices over a range of operating wave lengths, two pairs of rotatable threaded drive shafts supported in parallel relationship with said reference axis and mechanically coupled to said tuning elements to effect only longitudinal displacements thereof, the thread of one pair of said shafts being so proportioned with respect to the thread of the other pair that a given rotational displacement of said pairs of shafts produces predetermined relative longitudinal displacements of said tuning elements, a pair of identical gears fixedly secured to corresponding portions of said one pair of shafts, a pair of identical gears fixedly secured to corresponding portions of said other pair of shafts, a gear freely rotatable on one shaft of said one pair in meshing engagement with said fixed gears secured to said other pair, and means including a gear adjustably fixed on one shaft of said other pair in meshing engagement with said fixed gears secured to said one pair for selectively effecting simultaneous or independent rotational displacement of said two pairs of shafts.

3. A tunable electrical system comprising, a pair of tunable circuit devices each of which includes an adjustable element supported for longitudinal displacement with respect to a common reference axis to tune each of said devices over a range of operating wave lengths, two pairs of rotatable drive shafts supported in parallel relationship with said reference axis and mechanically coupled to said tuning elements to effect only longitudinal displacements thereof, a first pair of identical gears fixedly secured to corresponding portions of one of said pairs of shafts, a second pair of gears identical with said first pair and fixedly secured to corresponding portions of the other of said pairs of shafts, a gear freely rotatable on one shaft of said one pair in meshing engagement with said fixed gears secured to said other pair, and means including a gear adjustably fixed on one shaft of said other pair in meshing engagement with said fixed gears secured to said one pair for selectively effecting simultaneous or independent rotational displacement of said two pairs of shafts.

4. A tunable electrical system comprising, a pair of tunable circuit devices each of which includes an adjustable element supported for longitudinal displacement with respect to a common reference axis to tune each of said devices over a range of operating wave lengths, two pairs of rotatable drive shafts supported in parallel relationship with said reference axis and mechanically coupled to said tuning elements to effect only longitudinal displacements thereof, a pair of identical gears fixedly secured to corresponding portions of one of said pairs of shafts, a pair of identical gears fixedly secured to corresponding portions of the other of said pairs of shafts, a gear freely rotatable on one shaft of said one pair in meshing engagement with said fixed gears secured to said other pair, a gear supported on one shaft of said other pair in meshing engagement with said fixed gears secured to said one pair, and means for releasably locking said last-mentioned gear to its supporting shaft selectively to effect simultaneous or independent rotational displacements of said two pairs of shafts.

5. A tunable electrical system comprising, a pair of coaxially aligned resonant cavities each of which includes an adjustable element supported for longitudinal displacement with respect to a common reference axis to tune each of said cavities over a range of operating wave lengths, two pairs of rotatable drive shafts supported in parallel relationship with said reference axis and mechanically coupled to said tuning elements to effect only longitudinal displacements thereof, a pair of identical gears fixedly secured to corresponding portions of one of said pairs of shafts, a pair of identical gears fixedly secured to corresponding portions of the other of said pairs of shafts, a gear freely rotatable on one shaft of said one pair in meshing engagement with said fixed gears secured to said other pair, and means including a gear adjustably fixed on one shaft of said other pair in meshing engagement with said fixed gears secured to said one pair for selectively effecting simultaneous or independent rotational displacement of said two pairs of shafts.

6. A tunable electrical system comprising, three hollow concentric conductors of similar cross section constituting a pair of coaxial resonant cavities, a first short-circuiting element longitudinally adjustable along the outer and intermediate conductors for tuning one of said cavities over a range of operating wave lengths, a second short-circuiting element longitudinally adjustable along the inner and intermediate conductors for tuning the other of said cavities over a range of operating wave lengths, two pairs of rotatable drive shafts supported in parallel relationship with the common axis of said cavities and mechanically coupled to said tuning elements to effect only longitudinal displacement thereof, a pair of identical gears fixedly secured to corresponding portions of one of said pairs of shafts, a pair of identical gears fixedly secured to corresponding portions of the other of said pairs of shafts, a gear freely rotatable on one shaft of said one pair in meshing engagement with said fixed gears secured to said other pair, and means including a gear adjustably fixed on one shaft of said other pair in meshing engagement with said fixed gears secured to said one pair for selectively effecting simultaneous or independent rotational displacement of said two pairs of shafts.

7. A tunable electrical system comprising, three hollow concentric conductors of similar cross section constituting a pair of coaxial resonant cavities, a first short-circuiting element longitudinally adjustable along the outer and intermediate conductors for tuning one of said cavities over a range of operating wave lengths, a second short-circuiting element longitudinally adjustable along the inner and intermediate conductors for tuning the other of said cavities over a range of operating wave lengths, two pairs of rotatable drive shafts positioned in the space between said outer and intermediate conductors in parallel relationship with the common axis of said cavities and mechanically coupled to said tuning elements to effect only longitudinal displacement thereof, a pair of identical gears fixedly secured to corresponding portions of one of said pairs of shafts, a pair of identical gears fixedly secured to corresponding portions of the other of said pairs of shafts, a gear freely rotatable on one shaft of said one pair in meshing engagement with said fixed gears secured to said other pair, and means including a gear adjustably fixed on one shaft of said other pair in meshing engagement with said fixed gears secured to said one pair for selectively effecting simultaneous or independent rotational displacement of said two pairs of shafts.

8. A tunable electrical system comprising, three hollow concentric cylindrical conductors constituting a pair of coaxial resonant cavities, a first short-circuiting element longitudinally adjustable along the outer and intermediate conductors for tuning one of said cavities over a range of operating wave lengths, a second short-circuiting element longitudinally adjustable along the inner and intermediate conductors for tuning the other of said cavities over a range of operating wave lengths, two pairs of rotatable drive shafts supported in parallel relationship with the common axis of said cavities and mechanically coupled to said tuning elements to effect only longitudinal displacement thereof, a pair of identical gears fixedly secured to corresponding portions of one of said pairs of shafts, a pair of identical gears fixedly secured to corresponding portions of the other of said pairs of shafts, a gear freely rotatable on one shaft of said one pair in meshing engagement with said fixed gears secured to said other pair, and means including a gear adjustably fixed on one shaft of said other pair in meshing engagement with said fixed gears secured to said one pair for selectively effecting simultaneous or independent rotational displacement of said two pairs of shafts.

9. A tunable electrical system comprising, three hollow concentric conductors of similar cross section constituting a pair of coaxial resonant cavities, a first element short circuiting the outer and intermediate conductors to define effective and noneffective portions of one of said cavities and adjustable therealong to tune said one cavity over a range of operating wave lengths, a second element short circuiting the inner and intermediate conductors to define effective and noneffective portions of the other of said cavities and adjustable therealong to tune said other cavity over a range of operating wave lengths, two pairs of rotatable drive shafts projecting only into said noneffective portions of said cavities in parallel relation with their common axis and mechanically coupled to said tuning elements to effect only longitudinal displacement thereof, a pair of identical gears fixedly secured to corresponding portions of one of said pairs of shafts, a pair of identical gears fixedly secured to corresponding portions of the other of said pairs of shafts, a gear freely rotatable on one shaft of said one pair in meshing engagement with said fixed gears secured to said other pair, and means including a gear adjustably fixed on one shaft of said other pair in meshing engagement with said fixed gears secured to said one pair for selectively effecting simultaneous or independent rotational displacement of said two pairs of shafts.

10. A tunable electrical system comprising, three hollow concentric conductors of similar cross section constituting a pair of coaxial resonant cavities, a first short-circuiting element longitudinally adjustable along the outer and intermediate conductors for tuning one of said cavities over a range of operating wave lengths, a second short-circuiting element longitudinally displaced from said first tuning element and adjustable along the inner and intermediate conductors for tuning the other of said cavities over a range of operating wave lengths, two pairs of rotatable drive shafts positioned in the space between said outer and intermediate conductors in parallel relationship with the common axis of said cavities and mechanically coupled to said tuning elements to effect only longitudinal displacement thereof, a pair of identical gears fixedly secured to corresponding portions of one of said pairs of shafts, a pair of identical gears fixedly secured to corresponding portions of the other of said pairs of shafts, a gear freely rotatable on one shaft of said one pair in meshing engagement with said fixed gears secured to said other pair, means including a gear adjustably fixed on one shaft of said other pair in meshing engagement with said fixed gears secured to said one pair for selectively effecting simultaneous or independent rotational displacement of said two pairs of shafts, and an anti-backlash arrangement including a spring located in the space between said outer and intermediate conductors and anchored at its opposite ends to said first and second tuning elements to bias said elements toward one another.

BASIL A. BELS.

REFERENCES CITED

The following references are of record in the file of this patent:

UNITED STATES PATENTS

| Number | Name | Date |
|---|---|---|
| 2,117,090 | Grundmann | May 10, 1938 |
| 2,402,443 | Peterson | June 18, 1946 |
| 2,412,805 | Ford | Dec. 17, 1946 |
| 2,416,567 | McArthur | Feb. 25, 1947 |